United States Patent
Santoso et al.

(10) Patent No.: US 9,343,083 B2
(45) Date of Patent: *May 17, 2016

(54) METHOD AND APPARATUS FOR DETERMINING RELATIVE HEAD-TO-DISK SPEED

(71) Applicant: Marvell International LTD., Hamilton (BM)

(72) Inventors: Budi Santoso, Singapore (SG); Zhimin Yuan, Singapore (SG); Siang Huei Leong, Singapore (SG); Chun Lian Ong, Singapore (SG); Pantelis Alexopoulos, Singapore (SG)

(73) Assignee: Marvell International LTD., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 14/753,370

(22) Filed: Jun. 29, 2015

(65) Prior Publication Data

US 2015/0302871 A1  Oct. 22, 2015

Related U.S. Application Data

(63) Continuation of application No. 13/891,735, filed on May 10, 2013, now Pat. No. 9,070,416.

(60) Provisional application No. 61/645,140, filed on May 10, 2012.

(51) Int. Cl.
*G11B 21/02* (2006.01)
*G11B 5/09* (2006.01)
*G11B 27/36* (2006.01)
*G11B 19/04* (2006.01)
*G11B 5/60* (2006.01)

(52) U.S. Cl.
CPC ............... *G11B 5/09* (2013.01); *G11B 5/6029* (2013.01); *G11B 19/048* (2013.01); *G11B 27/36* (2013.01)

(58) Field of Classification Search
None
See application file for complete search history.

(56) References Cited

U.S. PATENT DOCUMENTS

| 7,411,754 B2 | 8/2008 | Wang et al. |
| 9,070,416 B2 * | 6/2015 | Santoso ............... G11B 27/36 |
| 2005/0046982 A1 | 3/2005 | Liu et al. |
| 2010/0177429 A1 | 7/2010 | Lee et al. |
| 2012/0033323 A1 | 2/2012 | Mathew et al. |
| 2013/0114161 A1 | 5/2013 | Yuan et al. |
| 2013/0148236 A1 | 6/2013 | Ong et al. |

* cited by examiner

*Primary Examiner* — Regina N. Holder

(57) ABSTRACT

A system including a write head, a read head, a mixer, and a filter. The write head is configured to write a pattern on a track of a medium of a hard disk drive, wherein the pattern has a first frequency. The read head is configured to read the pattern written on the track of the medium of the hard disk drive. The mixer is configured to mix a first signal generated by reading the pattern with a second signal to obtain a mixed signal. The second signal has a second frequency, and wherein the second frequency is different than the first frequency. The filter is configured to filter the mixed signal to determine a relative head-to-disk speed. The filter has a parameter selected based on a difference between the first frequency and the second frequency.

20 Claims, 15 Drawing Sheets

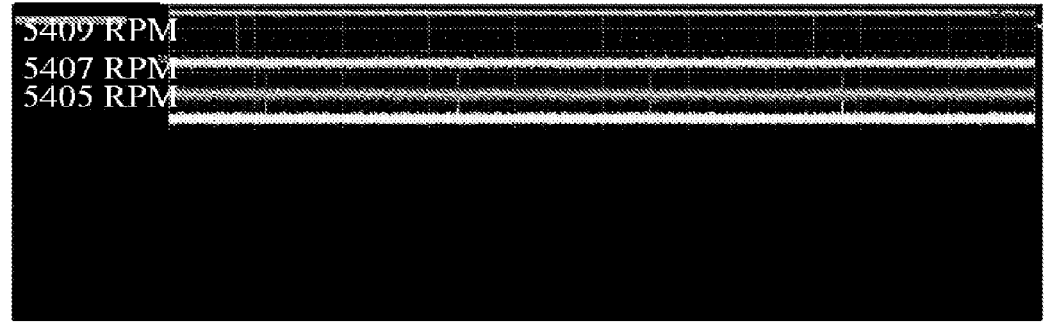
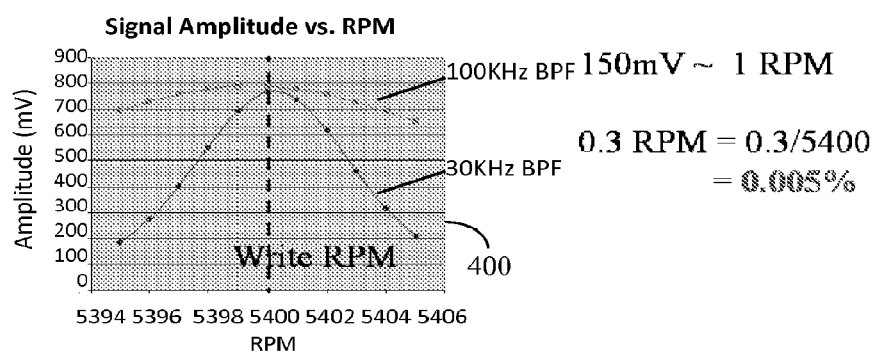
FIG. 4A
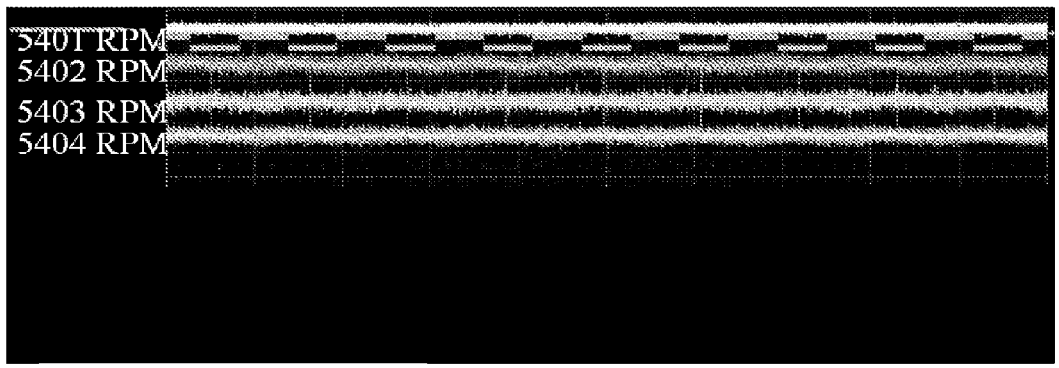
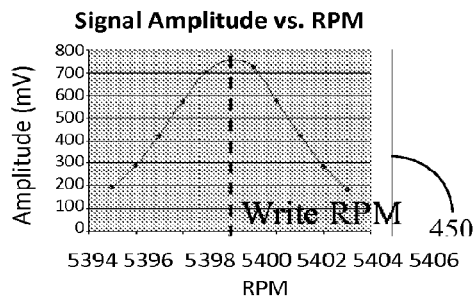
HDD with cover open
Tested by Media Tester
head loaded onto spinning
disk in HDD
FIG. 4B

Simulation Results
f1: A*Cos(2*pi*f1t+P1)     __1000__     A= 1, 5, 10,
f2: B*Cos(2*pi*f2t+P2)                  B = 1,
                                        P₁= P₂=0
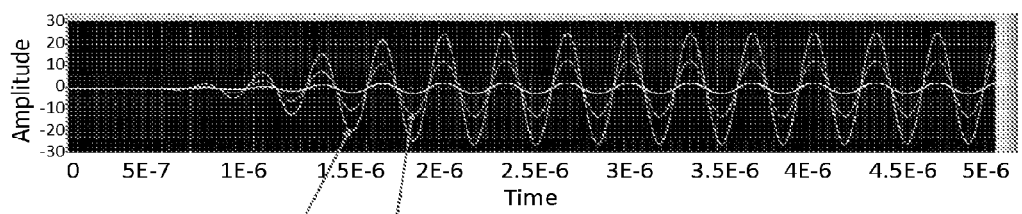
A=10     A=5
__1050__     A= 1, B = 1,
             P₁ = 0, 0.75, 1.5,
             P₂=0
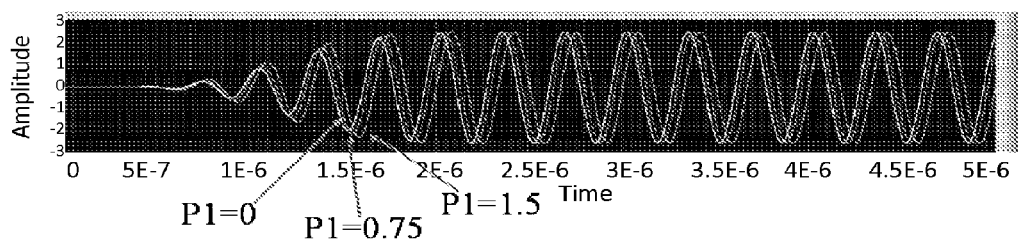
P1=0   P1=0.75   P1=1.5
*FIG. 10*

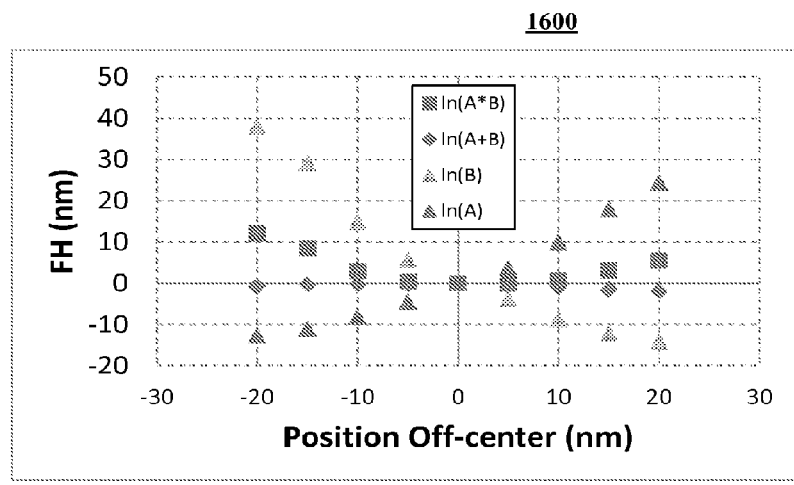
FIG. 16
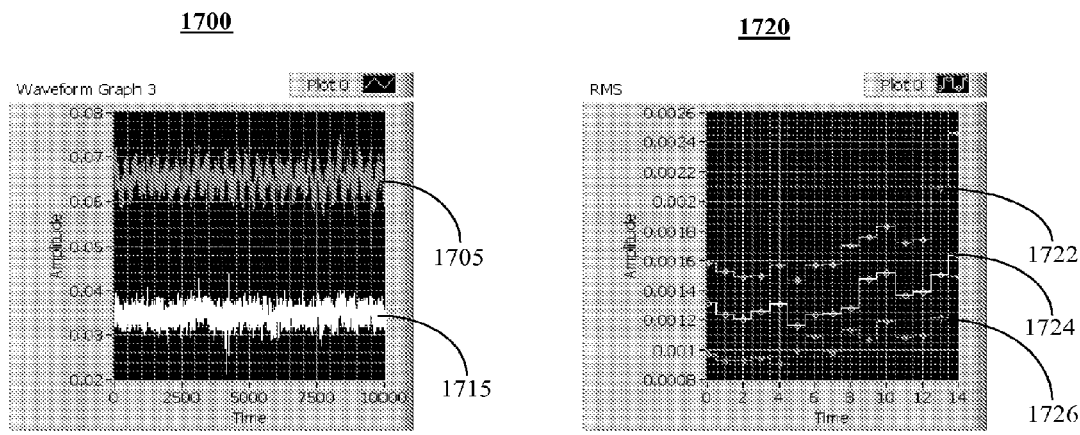
FIG. 17A  FIG. 17B

METHOD AND APPARATUS FOR DETERMINING RELATIVE HEAD-TO-DISK SPEED

CROSS-REFERENCE TO RELATED APPLICATIONS

The present disclosure is a continuation of U.S. patent application Ser. No. 13/891,735 filed on May 10, 2013, which claims the benefit of U.S. Provisional Application No. 61/645,140 filed on May 10, 2012. The entire disclosures of the applications referenced above are incorporated herein by reference.

FIELD

The present invention generally relates to data storage devices, and more particularly relates to hard disk drive (HDD) data storage products, including methods and apparatus for monitoring and adjusting the operation thereof.

BACKGROUND

Hard disk drives include a recordable medium and a head which is mounted to move above the recordable medium as the medium spins. As hard disk drives are designed to smaller and smaller sizes and the medium is designed to store more and more information on narrower and narrower tracks, it is imperative that the relative positions of the rotating medium and the moving head be monitored and other parameters such as relative motion and speed variations be monitored. Such monitoring is needed in order to correct any errors before they become too great. However, today's monitoring techniques are insufficient for the track widths, height tolerances and other parameters.

Thus, what is needed are robust monitoring and self-adjustment techniques for hard disk drives that are compatible with future ultra-thin, greater storage hard disk drives. Furthermore, other desirable features and characteristics will become apparent from the subsequent detailed description, taken in conjunction with the accompanying drawings and this background of the disclosure.

SUMMARY

According to the Detailed Description, a method for monitoring hard disk drive operation in a hard disk drive system is provided. The hard disk drive system includes a spindle, a disk and a head. The method includes the steps of writing a wide pattern having a predetermined frequency on a track of a hard disk drive medium, generating a readback signal by reading the wide pattern from the track, processing the readback signal by mixing the readback signal with a reference signal to obtain a summed signal and a difference signal, and filtering the summed signal by a filter centered around the difference signal to generate a measurement signal corresponding to a relative speed change of the spindle and a head-to-disk motion.

In accordance with another aspect of the present embodiment, a method for monitoring operation of a hard disk drive system is presented. The hard disk drive system includes a disk medium including a buried servo layer having a first frequency of data on a first track and a second frequency of data on a second track, the second track adjacent to the first track. The method includes the steps of reading a readback signal by a head positioned at the middle of the first track and the second track, filtering the signal by a first filter centered at the first frequency to extract a first component signal, filtering the signal by a second filter centered at the second frequency to extract a second component signal, combining the first component signal and the second component signal to generate a synchronization signal comprising downtrack information. The downtrack information may include spindle speed variation, spindle speed jitter, and relative head-disk vibration in the downtrack direction.

In accordance with yet another aspect of the present invention, a method for measuring flying height of a head over a disk medium in a hard disk drive (HDD) system is provided. The HDD system includes a disk medium having a buried servo layer with a first frequency of data on a first track and a second frequency of data on a second track, the second track adjacent to the first track. The method includes the steps of reading a readback signal by a head positioned at the middle of the first track and the second track, filtering the signal by a first filter centered at the first frequency to extract a first component signal, filtering the signal by a second filter centered at the second frequency to extract a second component signal, combining the first component signal and the second component signal using Wallace equations to generate a synchronization signal comprising flying height information. A further aspect includes developing a table of operational parameters for various pressures and temperatures from the flying height information for improved HDD system operation.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present invention.

FIG. 4, comprising FIGS. 4A and 4B, illustrates experimental results from the system of FIG. 1 in accordance with the present invention, wherein FIG. 4A shows experimental results obtained using the system of FIG. 1 on an air bearing spindle with a measured spindle speed variation and FIG. 4B shows experimental results obtained using the system of FIG. 1 for measurements on a hard disk drive (HDD) product.

FIG. 8, comprising FIGS. 8A and 8B, illustrates block diagrams of synchronization signal generation and processing for detection of downtrack vibration, spindle speed variation and jitter in accordance with the present embodiment, wherein FIG. 8A depicts a block diagram of the synchronization signal generation and FIG. 8B depicts a block diagram of the synchronization signal processing.

FIG. 10 illustrates a second set of simulation results of the synchronization signal processing of FIG. 8B in accordance with the present embodiment.

FIG. 15, comprising FIGS. 15A and 15B, illustrates a graph of touchdown curves in accordance with the present embodiment, wherein FIG. 15A depicts a touchdown curve using flying height signals averaged over one hundred measurements and FIG. 15B depicts a touchdown curve using an instantaneous flying height signal measurement.

FIG. 16 illustrates a graph of experimental results for off-track variations of the flying height signal measured in accordance with the present embodiment.

FIG. 17, comprising FIGS. 17A and 17B, illustrates simulation results of flying height signals under various conditions in accordance with the present embodiment wherein FIG. 17A depicts the flying height signal vibration prior and acoustic emissions (AEs) and FIG. 17B depicts root mean square values of the flying height signal as well as AE sensor signals.

Figure 1:
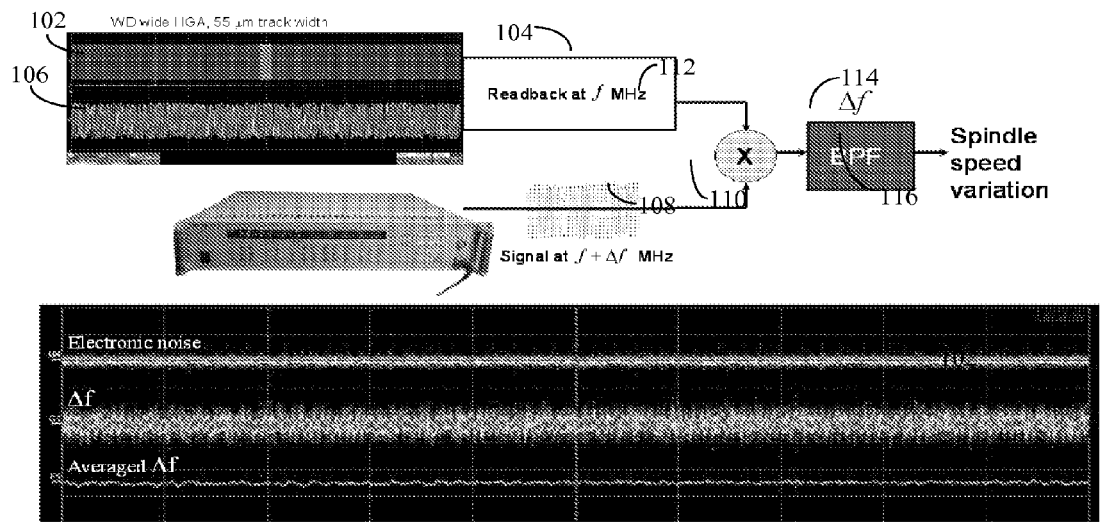
FIG. 1 illustrates a system for real time spindle speed variation and relative head-disk motion measurement in accordance with a present embodiment.

Skilled artisans will appreciate that elements in the figures are illustrated for simplicity and clarity and have not necessarily been depicted to scale. For example, the dimensions of some of the elements in the block diagrams may be exaggerated in respect to other elements to help to improve understanding of the present embodiments. In the drawings, reference numbers may be reused to identify similar and/or identical elements.

DESCRIPTION

The following detailed description is merely exemplary in nature and is not intended to limit the invention or the application and uses of the invention. Furthermore, there is no intention to be bound by any theory presented in the preceding background of the invention or the following detailed description of the invention. In this detailed description, three embodiments will be discussed: a novel and improved technique for relative head-disk motion and spindle speed variation measurement, a novel and improved technique for downtrack synchronization in a dedicated servo based magnetic recording system, and a novel and improved technique for flying height monitoring in dedicated servo based magnetic recording system.

A new embodiment is presented to measure, in addition to spindle speed variation, the relative head-disk downtrack motion. Unlike conventional approaches such as approaches using ball sensors and rotary encoders or approaches using back electromagnetic field (EMF) measurement for determining spindle speed, the present embodiment uses written-in information on a disk to provide continuous and real-time information about relative head-disk motion, including the effects of relative head-disk vibration. In addition, the present embodiment does not require additional components in a hard disk drive (HDD) implementation except firmware implementation of the present embodiment and a frequency source to be provided by the HDD system on chip (SOC) circuitry.

Current measurement techniques for spindle speed are typically implemented via rotary encoders (optical), hall sensors or measurement of back EMF. For a hard disk drive (HDD) which uses brushless DC (BLDC) motors and performs spindle speed measurement, such measurement can be accomplished through Hall sensors built into the motor. In addition it is also possible, depending on the driving circuitry, to measure spindle speed from back EMF.

However, all these methods provide only information on the rotational speed of the spindle and, therefore, are unable to provide the actual relative head-disk speed or motion which is affected by other effects such as head-disk vibrations. In addition, the need to further increase recording density means that current and future HDDs will move towards very few grains/bit recording. This puts added stress on the ability to write accurately on the magnetic bits. The need for accurate and synchronized writing means that spindle speed variation, jitter and undesired relative head-disk motion and vibration need to be kept very small. At the same time, the ability to accurately measure and quantify such spindle speed variation, jitter and undesired relative head-disk motion and vibration at high resolution becomes very important.

The present embodiment presents a method and approach which can, in addition to measuring the spindle speed and speed variations, also provide measurement for downtrack relative motion and vibration between head and disk at high resolution. Referring to FIG. 1, a diagram 100 depicts a first approach for real time spindle speed variation and relative head-disk motion measurement. First, a pattern 102 is written on a track on the disk preferably using a wide writer head. This wide track pattern 102 will reduce the off-track interference which can degrade a readback signal 104.

The readback signal 104 is read back from the wide track pattern 102 at a frequency f 106. Similar to a rotary encoder scheme, the higher the frequency f 106 used, the better the resolution. Since the achievable "encoded" resolution is limited only by a bandwidth of the read-write (RW) head and a disk media combination, a very high frequency in the hundreds of megahertz can be used, enabling an approach which is far superior to any conventional rotary encoder scheme. However, in order to strike a balance between signal to noise ratio and resolution, a frequency of around 80 MHz to 150 MHz for current HDDs is preferred.

Subsequently, the RW head is positioned over the written track 102 and reads back the written track in a continuous fashion. By using a reference clock signal 108 at frequency f+$\Delta$f, and mixing at a mixer 110 the reference clock signal 108 with the readback signal at frequency f 112, a mixed signal having signal components at a summed frequency 2f+$\Delta$f and a difference frequency $\Delta$f are obtained.

By using a filter 114 (e.g., a band pass filter (BPF) or narrow band filter) centered at around frequency $\Delta$f, a resulting measurement signal 116 corresponding to relative spindle speed change and head-disk motion is obtained. It is possible to also use a BPF 114 that is slightly offset from $\Delta$f depending on the range of relative speed variation to be measured. The width of the filter 114 passband may also be a necessary parameter of this embodiment. A sharper (smaller passband)

filter 114 will provide a larger signal change (i.e., more sensitive) for the same relative speed change, but may suffer from a limited range of speeds that can be measured. Thus, a good trade-off between the target range of measurement versus sensitivity is desired to achieve optimal results.

The above approach depicted in the diagram 100 provides very high resolution. However, one drawback of this approach is that the measurement signal generated is not monotonously increasing or decreasing. Since the signal peaks at a center frequency, the measurement may sometimes be ambiguous. This may be especially true when the measurement range spans to the left and right of the peak, as shown in the signal amplitude vs. RPM graphs 400, 450 in FIGS. 4A and 4B.

Figure 2:
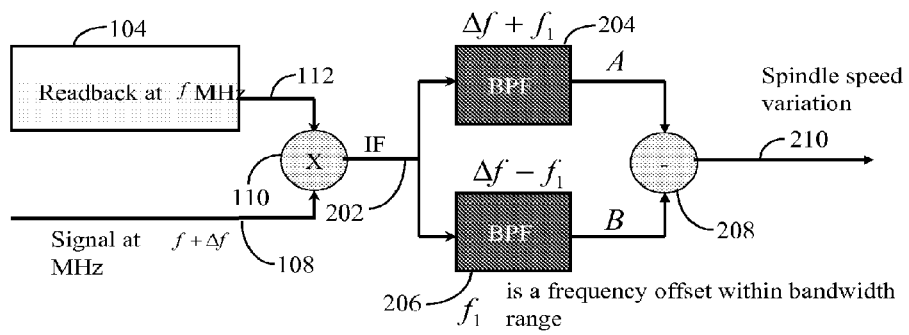
FIG. 2 illustrates a double filter variant of the system of FIG. 1 in accordance with the present embodiment.

A second approach is depicted in diagram 200 of FIG. 2. This second approach alleviates any ambiguity problem that may be present in the first approach by using two matched filters 204, 206 instead of a single filter 114. The steps to generate the readback signal 112 are the same as the first approach where a wide track of a single frequency is written and mixed at a mixer 110 with a reference clock signal 108 of the same writing frequency. However, this second approach provides the resulting mixed signal IF 202 to the two filters 204, 206, wherein the first filter 204 is centered at $\Delta f + f_1$, and the second filter 206 is centered at $\Delta f - f_1$, generating the filtered signals A and B, respectively. The frequency $f_1$ is a frequency passband offset within the bandwidth of the first and second bandpass filters 204, 206. A normalization procedure such as $(A-B)/(A+B)$ can then be applied by the combiner 208 to provide a monotonously increasing signal 210 over the range of relative spindle speeds to be measured.

Figure 3:
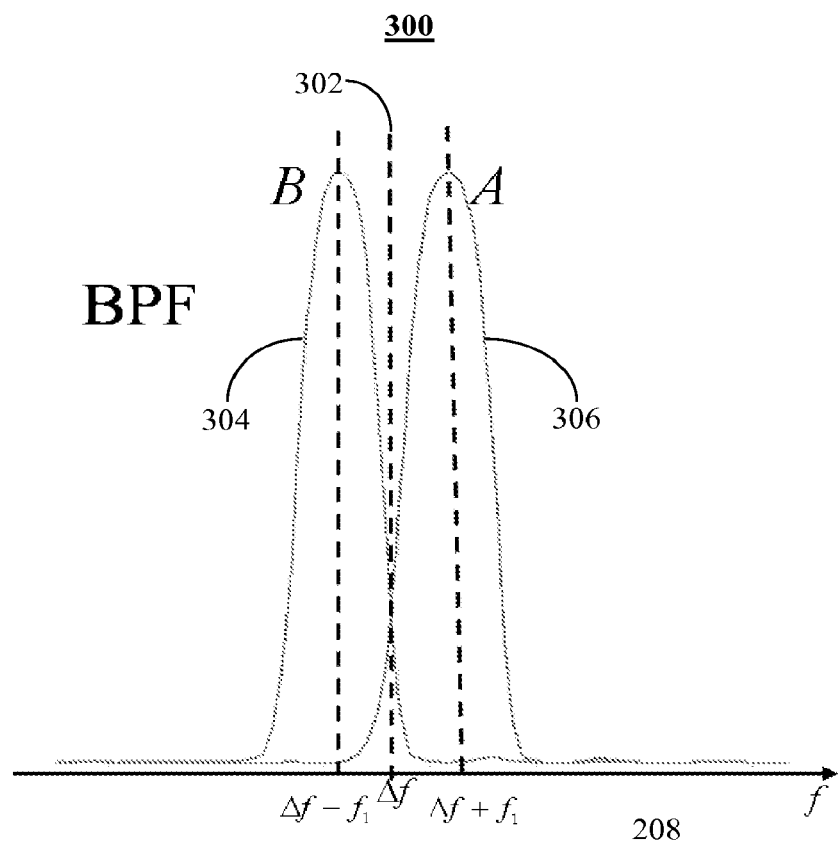
FIG. 3 illustrates a graph of filtered signals of the variant system of FIG. 2 in accordance with the present embodiment.

Referring to FIG. 3, a graph 300 further illustrates this second approach. When measured signal $\Delta F$ is less than $\Delta f$302, the measured signal $\Delta F$ moves further into the passband of the B signal 304 and away from the passband of the A signal 306. If $\Delta F$ is, instead, greater than $\Delta f$302, the measured signal $\Delta F$ moves into the passband of the A signal 306 and away from the passband of the B signal 304. Since the signal A 306 must increase when the signal B 304 decreases and vice versa, the resulting signal $(A-B)/(A+B)$ is monotonously increasing for the measurement range between $\Delta f + f_1$ and $\Delta f - f_1$, thereby removing the ambiguity. Depending on the measurement range required, appropriate $f_1$ values and filter widths can be chosen for optimal results.

Figure 5:
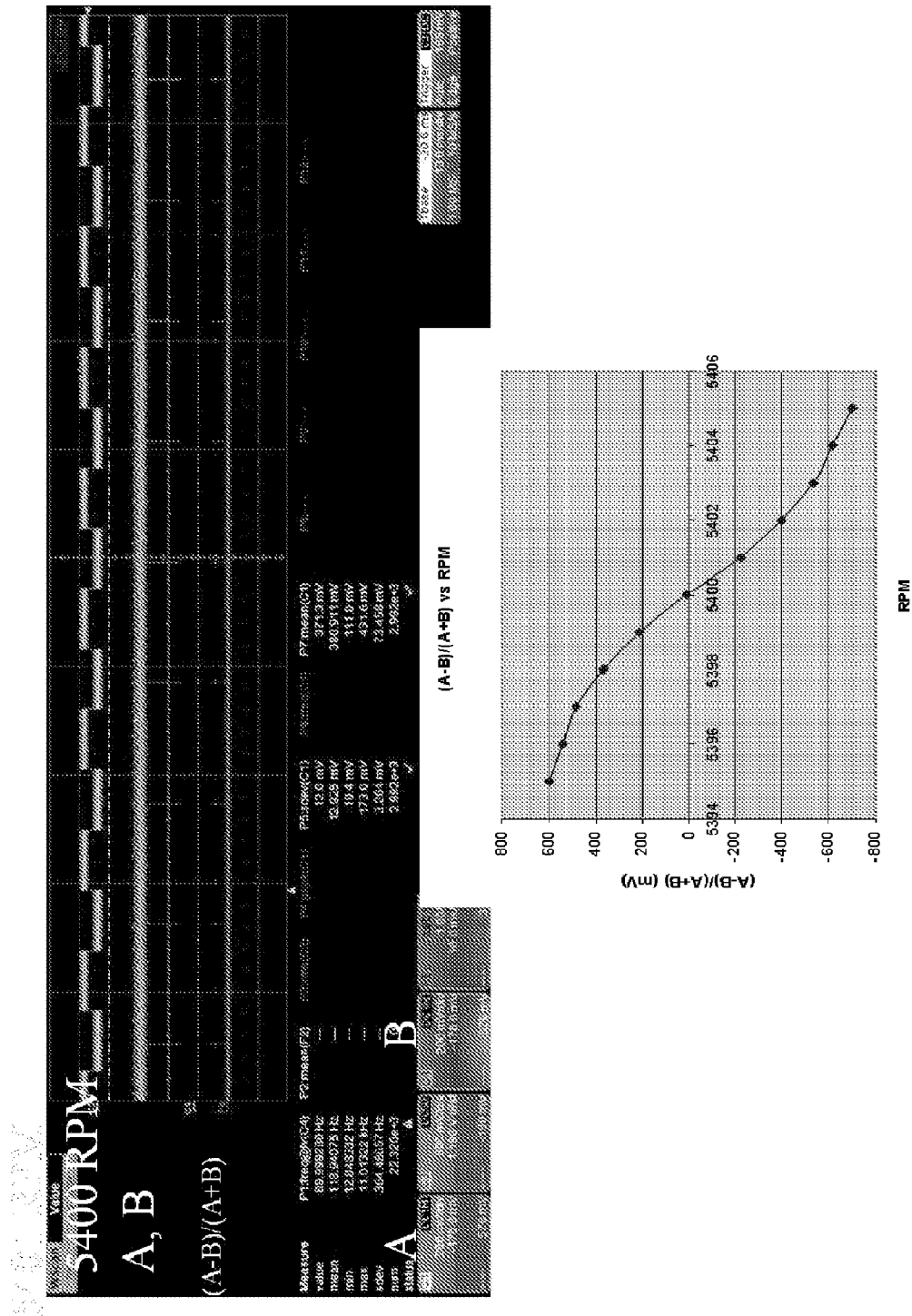
FIG. 5 illustrates experimental results obtained using the system of FIG. 2 for measurements on the HDD product of FIG. 4B in accordance with the present invention.

FIG. 4A shows experimental results in the graph 400 obtained using the first approach for measurements on the air bearing spindle with a measured spindle speed variation of 0.005%. FIG. 4B shows experimental results in the graph 450 obtained using the first approach for measurements on a HDD product. And FIG. 5 shows experimental results in the graph 500 when the second approach is used on a HDD product.

The technology and approaches in accordance with the present embodiment can be easily applied to present HDD products. Because no additional components are required except a reference clock and digital filtering, both of which may be easily provided by the HDD system on chip (SOC), large additional costs of implementation are avoided. Also, by implementing the technology into a HDD system and its associated firmware, it is possible to use the technology not only during HDD manufacturing/assembly and in failure analysis situations, but also during normal use by end users.

In the manufacturing and assembly stage, HDD products after assembly could go through a long process of checks including formatting and testing of the media. For very large drives, this could take a long time. Due to manufacturing tolerances and production yields, not all assembled products can work at the same recording density. If the end tested product is found to be unsuitable for a certain recording density, it needs to be downgraded to a lower density level. A test approach in accordance with the present embodiment could be applied, for example, after drive assembly and prior to the formatting and testing step to ascertain the quality of the assembled drive. If at this stage, a drive is found to be of a "lower quality" from measured large speed variations, jitter or relative head-disk vibrations, then the drive can be put to a lower density level immediately. Thus, a simple measurement in accordance with the present embodiment is enabled which could help reduce the manufacturing cost by detecting the quality of the end product earlier without requiring expensive and extensive testing, thereby exemplifying an intelligent manufacturing approach.

The testing approach in accordance with the present embodiment is also useful for the HDD under normal use by end users. For example, it is possible to program the drive for regular self-testing using the testing approach in accordance with the present embodiment. Such self-testing can be performed by the HDD when the drive is idle, thereby serving as a self-reliability check during the HDD's operable life. Any variations in test results can indicate potential drive problems and future failure that need to be fed bank to the user for remedial actions before a catastrophic failure actually occurs.

Finally, in a Failure Analysis (FA) situation, the FA process may include running a test in accordance with the present embodiment and examining the test results. A degrade in performance (e. g., increased head-disk vibration or variations in relative spindle speed) could indicate the possible source of a problem to the drive engineer even before a complete tear-down is warranted. Thus, the present embodiment can also serve as a quick initial check for the FA process.

In one aspect of the present invention, a method for monitoring hard disk drive operation in a hard disk drive system including a spindle, a disk and head is provided. The method includes the steps of writing a pattern having a predetermined frequency on a wide track of a hard disk drive medium, generating a readback signal by reading the pattern from the track, processing the readback signal by mixing the readback signal with a reference signal to obtain a summed signal and a difference signal, and filtering the summed signal by a filter centered around the difference signal to generate a measurement signal corresponding to a relative speed change of the spindle and a head-to-disk motion.

The monitoring techniques in accordance with the present embodiment advantageously use written-in information on the disk instead of relying on external sensors such as Hall sensors or rotary encoders, thereby enabling the actual head-disk relative speed and motion to be measured instead of only the spindle speed variation (conventional approaches only measure spindle speed but cannot know relative head-disk vibration). Also, the present embodiment can be implemented in firmware on the HDD and does not require additional components like Hall sensors. Only a frequency source is required, and such frequency source can be provided by the HDD system on chip (SOC). Additionally, the written-in ("encoded") track on the disk media can be at a very high frequency, providing robust, high resolution of measurements, the resolution only being limited by the Read/Write (R/W) capability of the head and media combination. Further, the present embodiment can be used in conjunction with existing spindle speed control schemes in HDD, and can be applied to current HDDs as a means for qualification of HDD components (e. g., the spindle).

As HDD technology moves towards fewer grains/bit recording as well as future configurations such as Two Dimensional Magnetic Recording (TDMR) and bit-patterned media, the need to be able to determine the location of the write and read head versus the location of individual bits becomes very important. Thus, the availability of a synchronization signal to determine these locations is paramount. When utilizing a dual frequency dedicated servo media, where the presence of a dedicated servo magnetic layer allows "always on" servo information, the possibility arises to obtain a "continuously on" write synchronization signal. This "continuously on" signal does not only help with accurate writes on location sensitive media but also provides a means to detect and measure down track and spindle vibration, speed and other conditions.

Figure 6:
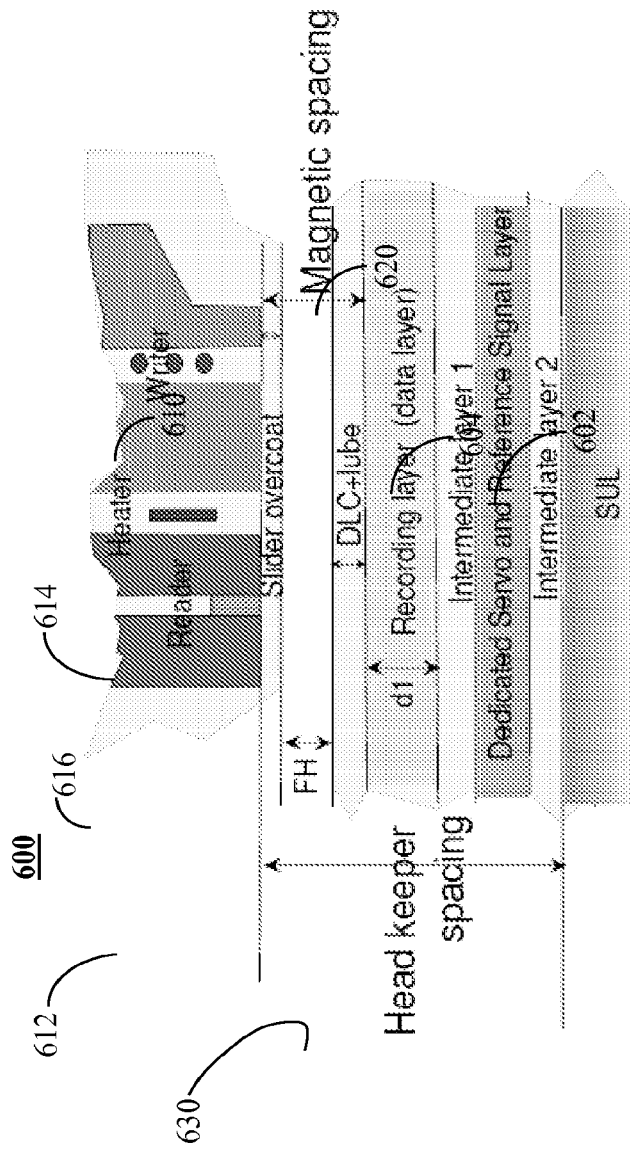
FIG. 6 illustrates a cutaway view of a read-write head over disk media in accordance with the present invention.

In accordance with a second aspect of the present embodiment, a new configuration is proposed to make use of the frequency based dedicated servo signal to produce an always available write synchronization signal that can allow bit location determination, as well as detection of downtrack vibration, spindle speed variation, and jitter. A dedicated servo layer 602 located below the data magnetic layer 604 is shown in the cutaway view 600 in FIG. 6. Multi-frequency or dual frequency based servo schemes can be utilized in the dedicated servo layer 602. A slider head 610 includes a reader head 612 and a writer head 614 for reading and writing to the magnetic layers 602 and 604. The slider head 610 also includes a heater 616 for thermal fly height control (TFC) as known to those skilled in the art. It is important to know the vibration, speed variation and jitter information in order to enable synchronized writing.

Figure 7:
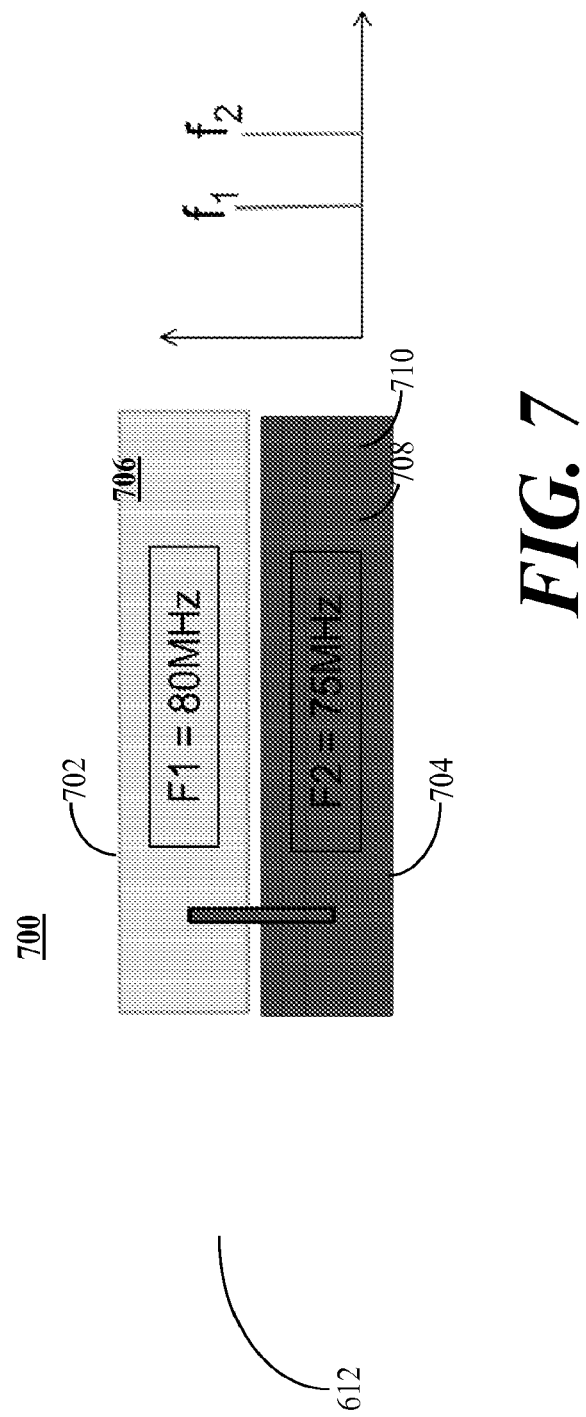
FIG. 7 illustrates atop planar view of the reader head of FIG. 6 superimposed over tracks of a servo layer of the disk media of FIG. 6 in accordance with the present embodiment.

Referring to FIG. 7, a top planar view 700 shows that the reader head 612 is positioned at the middle of two tracks 702, 704 to read back the superposition of the signals from the two servo tracks 702, 704 in the dedicated servo layer 602. The signals from the two servo tracks 702, 704 are two separate frequencies as shown in a graph 706 (i.e., a frequency F1 708 and a frequency F2 710).

Figure 8A:
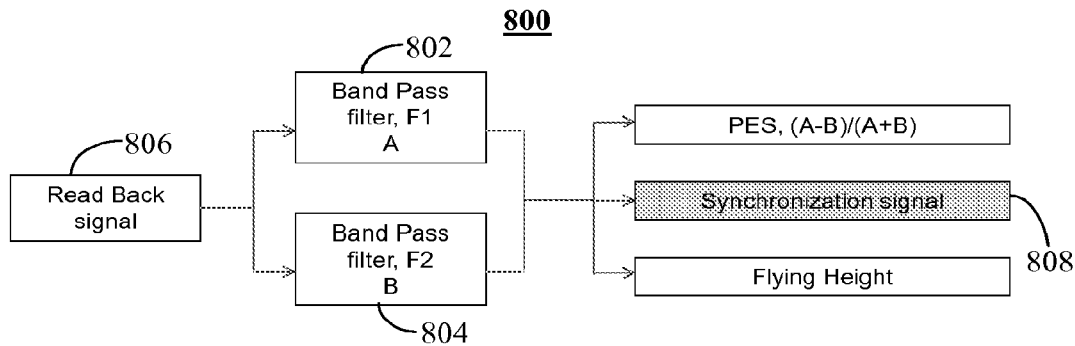
Figure 8B:
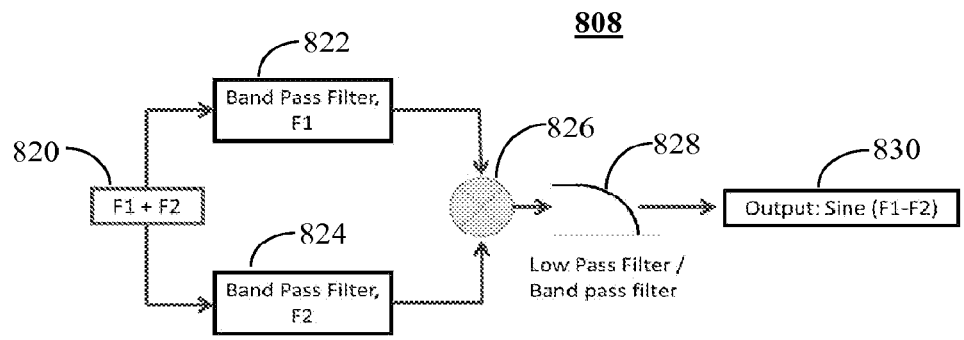

The process to generate the synchronization signal is given in FIG. 8, including FIGS. 8A and 8B. Referring to FIG. 8A, a block diagram 800 shows that by applying analog filters or digital filters 802, 804 centered at F1 and F2 frequencies 708, 710, respectively, to the read back signal 806 respective frequency components can be extracted, namely frequencies A and B corresponding to the signals from servo tracks f1 702 and f2 704, respectively. The signals can be further processed to generate a signal 808 that can be used for write synchronization write synchronization in, for example, Two Dimension Magnetic Recording (TDMR), as well as for the detection of downtrack vibration, spindle speed variation and jitter.

The readback signal 806 from the dedicated servo system consists of both a data signal and a servo signal. Referring to FIG. 8B the F1+F2 signal 820 from the filters 802, 804 (FIG. 8A) is processed using filters 822, 824 (either analog bandpass or low pass filters or digital filters) to obtain the F1 and F2 components. The separate F1 and F2 signals are then mixed at a mixer 826 and filtered by a low pass or band pass filter 828 to generate a Sine(F1−F2) signal 830 which constitutes the synchronization signal. As the synchronization signal 830 is obtained entirely from the written-in dedicated servo signals (F1 and F2), no external reference clock or oscillator is required. This means that the synchronization signal 830 avoids any phase and frequency drift that is common when an external reference clock is used. At the same time, the synchronization signal 830 will fully reflect downtrack changes in the HDD system such as spindle speed variation and jitter, and relative head-disk vibration in the down track direction.

Figure 9:
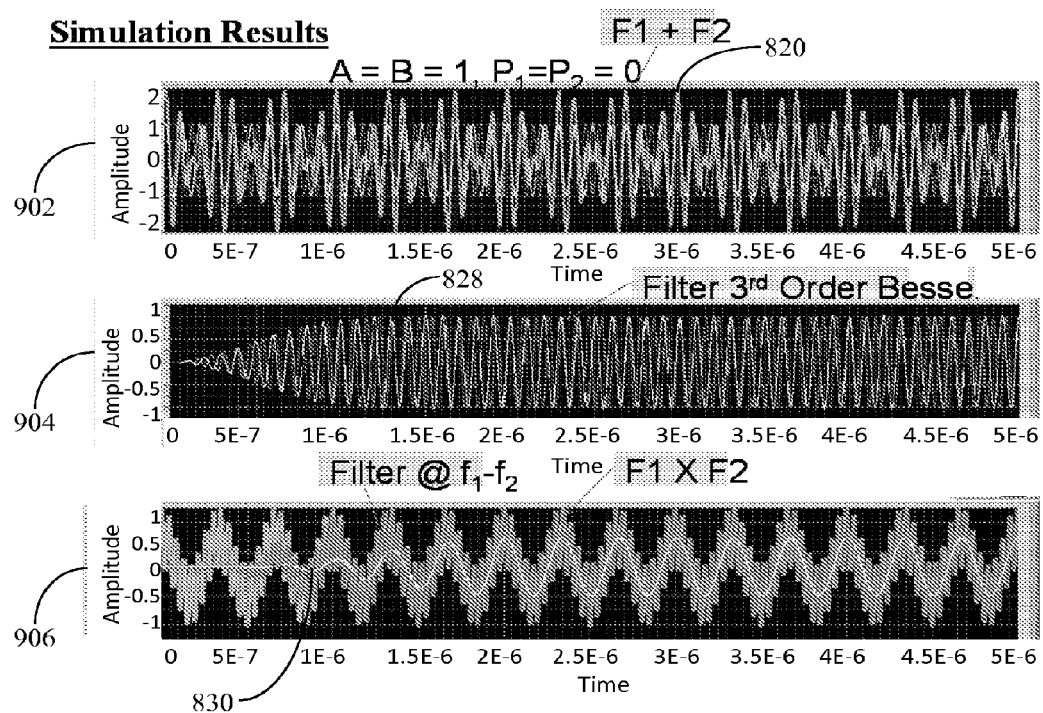
FIG. 9 illustrates a first set of simulation results of the synchronization signal processing of FIG. 8B in accordance with the present embodiment.
Figure 11:
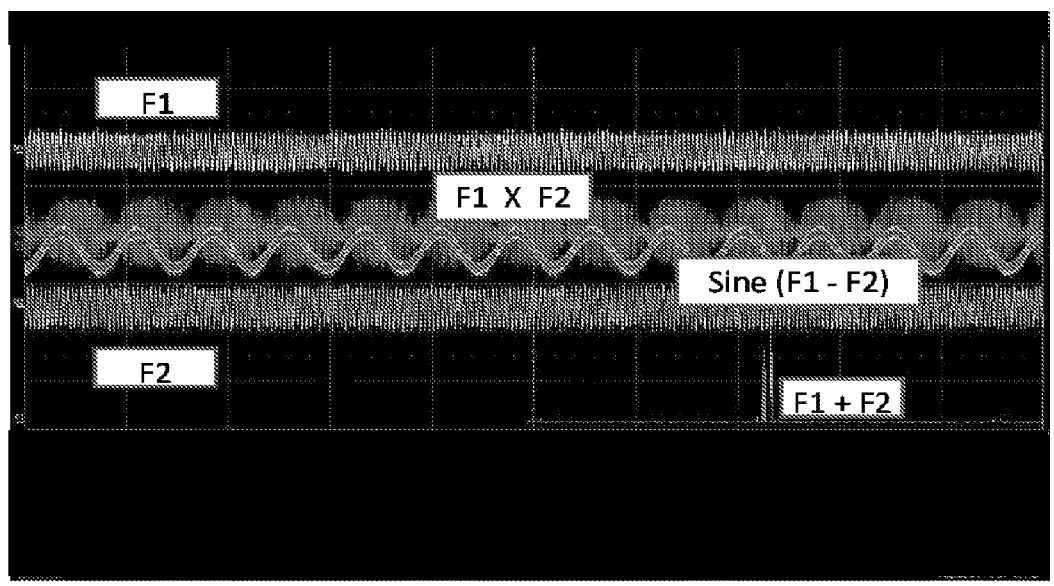
FIG. 11 illustrates spinstand simulation results of the synchronization signal processing of FIG. 8B in accordance with the present embodiment.

FIG. 9 depicts three traces 902, 904, 906 that show the simulation results for the generation of the synchronization signal 830 from the dedicated servo signal. Referring to FIG. 10, simulation results are depicted in a first trace 1000 that illustrates the synchronization signal 830 is resilient to relative changes in the amplitude of the servo F1 and F2 components which can occur if there is off-track in the read-write head. Essentially by detecting the zero crossing of the AC synchronization signal, effects of off-track which can manifest for example in a different amplitude of the synchronization signal are ignored. A second trace 1050 shows that the synchronization signal 830 is responsive to a relative phase difference between F1 and F2 components. Referring to FIG. 11, the results 1100 further show the actual spinstand experimental results for generating the synchronization signal 830, Sine(F1−F2).

The synchronization signal 830 provides a means to know the location of the read head 612 in the downtrack direction. For example, the synchronization signal 830 can be measured and can be translated into a location in the downtrack direction. While a simplified approach counts the number of zero-crossings from the start of a sector or index mark, other methods that can detect phase may also be used. The zero-crossing detector approach is useful because it is not affected by changes in the amplitude of the synchronization signal 830. By knowing the current location of the read head 612, it is possible to estimate the location of the write head 614. With a known location of the write head 614, synchronized writing utilizing measurements in accordance with the present embodiment can accurately write on targeted magnetic bits.

Figure 12:
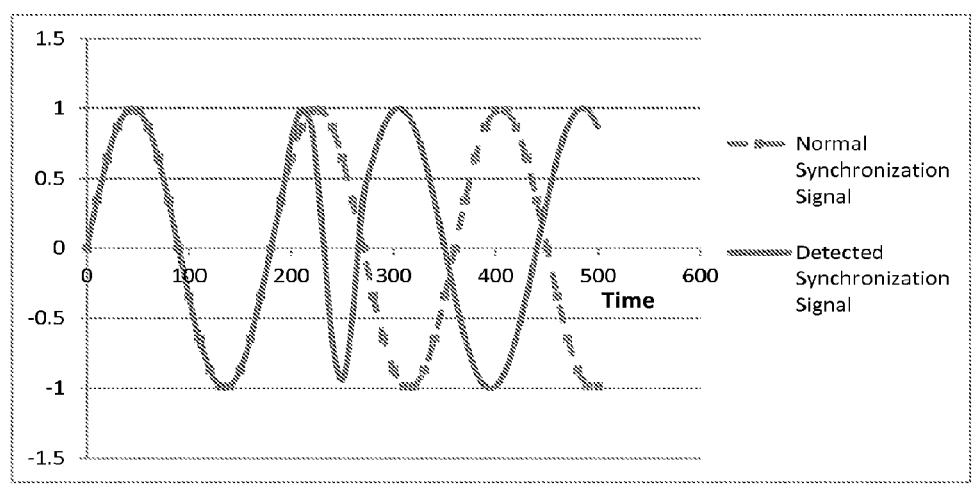
FIG. 12 illustrates a graph of a normal synchronization signal and a detected synchronization signal in a speed increase situation in accordance with the present invention.

In addition to synchronized writing, another advantageous use of the synchronization signal 830 is that it provides information on relative head-disk motion and captures information including undesired jitter, vibration and shock. For example, a deviation or change to the synchronization signal 830 at a particular instant of time indicates that there is an event that has caused a disturbance in the downtrack direction. Referring to FIG. 12, a graph 1200 shows an example where relative head-disk speed suddenly increased for a short duration, resulting in a detected synchronization signal 830 that has deviated from the expected or normal signal. By monitoring the synchronization signal 830 to detect deviations, Δ Sine (F1−F2), it is possible to detect and measure events such as downtrack vibrations or changes in spindle speed.

The ability to monitor downtrack changes and predict downtrack location is advantageous. In the dedicated servo implementation in accordance with the present embodiment, this is even more useful because such monitoring and measurement is available everywhere by virtue of the fact that servo track information is available everywhere on the disk. By implementing the invention into a HDD, for example through firmware in the HDD system on chip (SOC), the monitoring and measurement can become an important tool to detect HDD operational conditions such as excessive shock or vibration and allow the HDD to respond quickly and take preventive action to avoid failure and crash. Regular measurement of the vibration in accordance with the present embodiment can also help to monitor reliability of the drive while in operation. Finally, the present embodiment provides a useful Failure Analysis tool to determine whether the performance of the drive has degraded.

In accordance with this second aspect of the present embodiment, a method for monitoring operation of a hard disk drive system having a disk medium including a buried servo layer having a first frequency of data on a first track and a second frequency of data on a second track, the second track adjacent to the first track, is provided. The method includes the steps of reading a readback signal by a head positioned at the middle of the first track and the second track, filtering the signal by a first filter centered at the first frequency to extract a first component signal, filtering the signal by a second filter centered at the second frequency to extract a second component signal, combining the first component signal and the second component signal to generate a synchronization signal comprising downtrack information. The downtrack information may include spindle speed variation, spindle speed jitter, and relative head-disk vibration in the downtrack direction.

In accordance with the present embodiment, written-in servo information for phase recovery is used. Thus, no additional information or programming is required. In addition, operation in accordance with the present embodiment does not require an external oscillator, thereby avoiding phase drift between a reference frequency and the written-in servo frequency. Also, operation in accordance with the present embodiment is less affected by jitter and spindle speed variation since the (F1-F2) signal follows spindle jitter and speed variations due to using the written-in servo information for timing. Further, the synchronization signal S30 is resilient to crosstrack and off-track effects (i.e., the AC zero crossing is unaffected by the relative strength of servo components in the dual frequency servo layer). The changes to the synchronization signal 830 reflect downtrack spindle jitter or speed variations, as well as relative head-disk vibration and shock. Thus, operation in accordance with the present embodiment can help HDD technology to achieve higher linear bits per inch recording which is required to meet continued areal density growth.

In accordance with another aspect of the present embodiment, a new configuration is proposed to make use of a frequency based dedicated servo signal to produce an always available Flying Height (FH) signal with minimum off-track FH variation. This FH signal can be used as an additional monitoring signal for contact detection and HDD reliability.

With the application of thermal Flying Height control (TFC) technology, the Wallace equation based in-situ FH testing technology becomes the major way to measure the FH of Read/Write (R/W) heads. In theory, one single harmonic is good enough to detect the FH variation. But in actual application, the off-track of a read head changes the amplitude of a readback signal and may be misinterpreted as a change in Flying Height. This is one of the major sources of FH testing error. In order to minimize such FH testing error, a harmonic ratio method is typically preferred. It requires a write-in data pattern that can produce at least two harmonics with harmonic signals of sufficient strength for accurate measurement. However, due to the special write-in pattern required on the media, the FH value is not always available in HDDs. Further, conventional FH measurement techniques currently incorporate an acoustic emission (AE) sensor or contact sensor into the magnetic read/write head of a HDD system to detect the contact point. The additional sensor(s) disadvantageously incur additional component cost for the HDD.

Figure 13:
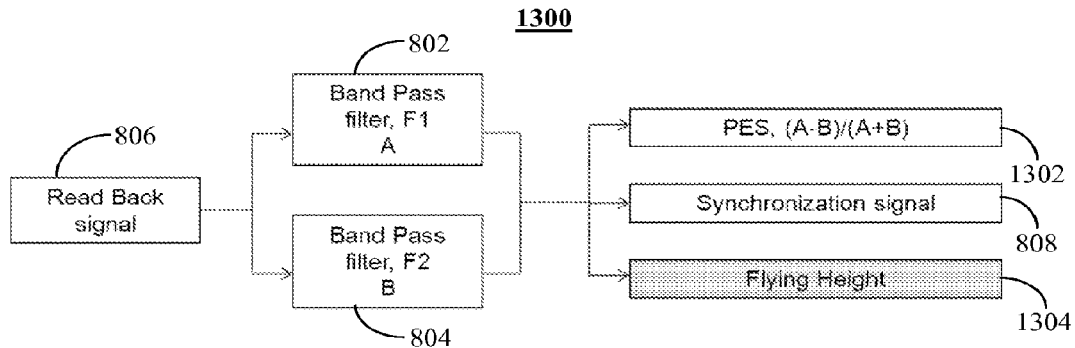
FIG. 13 illustrates a block diagram of position error signal (PES) generation and flying height signal generation in accordance with the present invention.

In accordance with a third aspect of the present embodiment, the dedicated servo layer 602 in the HDD disk medium is utilized to provide an always available FH signal and advantageously offers minimization of the effects of off-track FH variation. This FH signal can be used as an additional monitoring signal for contact detection and HDD reliability. Referring back to FIG. 6, the dedicated servo layer 602 is located below the date magnetic layer 604 in the disk medium. The flying height (FH) 630 refers to the height of the head 610 as it flies over the disk medium. Multiple frequencies or a single frequency of data are stored on the servo tracks of the servo layer 602. The reader 612 is positioned at the middle of two tracks 702, 704 to read back the superposition of the signal as shown in FIG. 7. Referring to the block diagram 1300 of FIG. 13, by applying analog or digital filters 802, 804, the signal for the respective frequency components can be extracted from the readback signal 806, and the amplitude of the signals, namely A and B can be determined. The amplitude of the signals can be further processed to produce a position error signal (PES) 1302, the synchronization signal 808 and a flying height signal 1304.

Based on the Wallace Spacing Loss equation, the spacing Loss is expressed as:

$$A = e^{-2\pi d/\lambda}$$

where $\lambda$ is the wavelength of the written data pattern and d is the relative change in spacing. Based on the amplitude ratio of the Wallace equation, we can use five different Wallace spacing methods (obtained from equation (I)) to calculate FH from the simultaneous two frequency servo signal. They are:

$$\Delta d = -\frac{\Delta \ln(A) * \lambda_A}{2\pi} \tag{2}$$

$$\Delta d = -\frac{\Delta \ln(B) * \lambda_B}{2\pi} \tag{3}$$

$$\Delta d = -\frac{\Delta \ln(AB)}{2\pi} \left| \frac{\lambda_A \lambda_B}{\lambda_B + \lambda_A} \right| \tag{4}$$

$$\Delta d = -\frac{\Delta \ln(A/B)}{2\pi} \left| \frac{\lambda_A \lambda_B}{\lambda_B - \lambda_A} \right| \tag{5}$$

$$\Delta \ln(A/B) = \ln \left| e^{\frac{2\pi d}{\lambda_A}} + e^{\frac{2\pi d}{\lambda_B}} \right| \tag{6}$$

Figure 14:
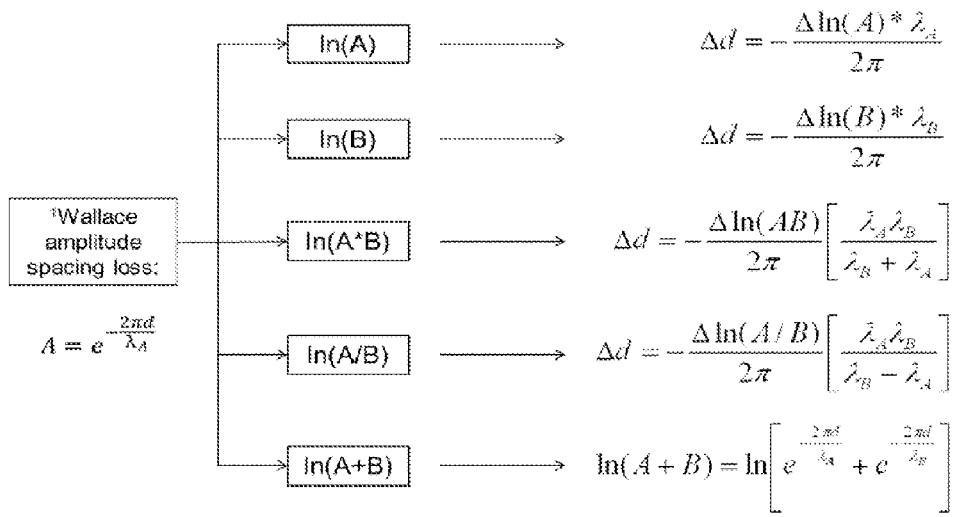
FIG. 14 illustrates Wallace equation generation in accordance with the present embodiment.

The above equations are based on ln(A), ln(B), ln(A*B), ln(A/B) and ln(A+B). The respective equations are shown in FIG. 14. It is straightforward to calculate FH based on the first four equations. However, for the case ln(A+B), a more complex equation is needed to calculate FH and d needs to be calculated from a trial and error or iterative approach.

Alternatively, a simple calibration approach can be taken to determine the FH instead of solving the complex equation (6). In this case, we use the ln(A*B) case to calibrate FH for ln(A+B). The calibration equation is shown below:

$$\Delta d = \frac{\Delta \ln(A + B)}{\Delta \ln(A + B)_x} x \Delta d_x \tag{7}$$

where x is the relative TFC applied and $\Delta d_x$ is the corresponding relative FH measured by $\Delta \ln(A*B)_x$. By normalizing the $\Delta \ln(A+B)$ against $\Delta \ln(A+B)_x$, the FH can be deduced.

Figure 15A:
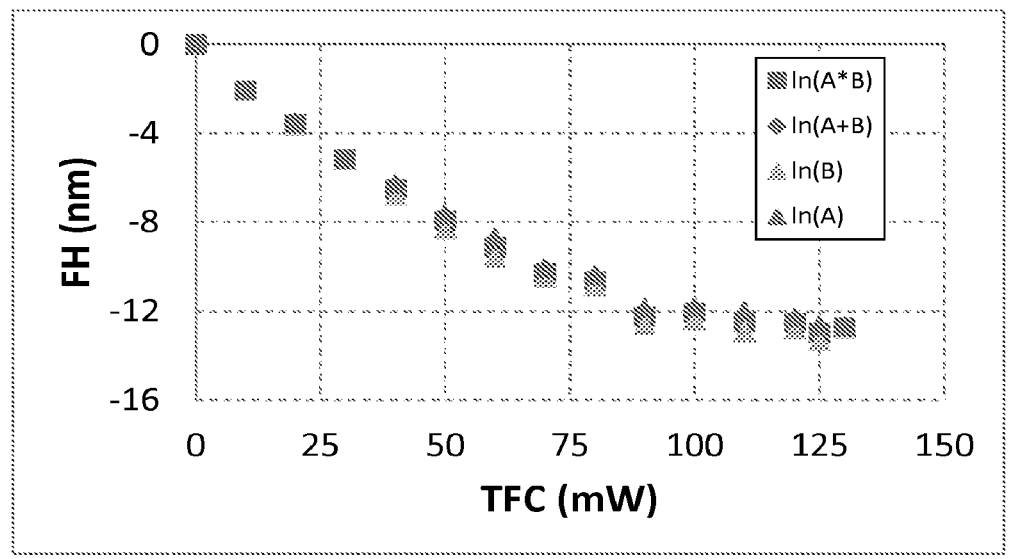
Figure 15B:
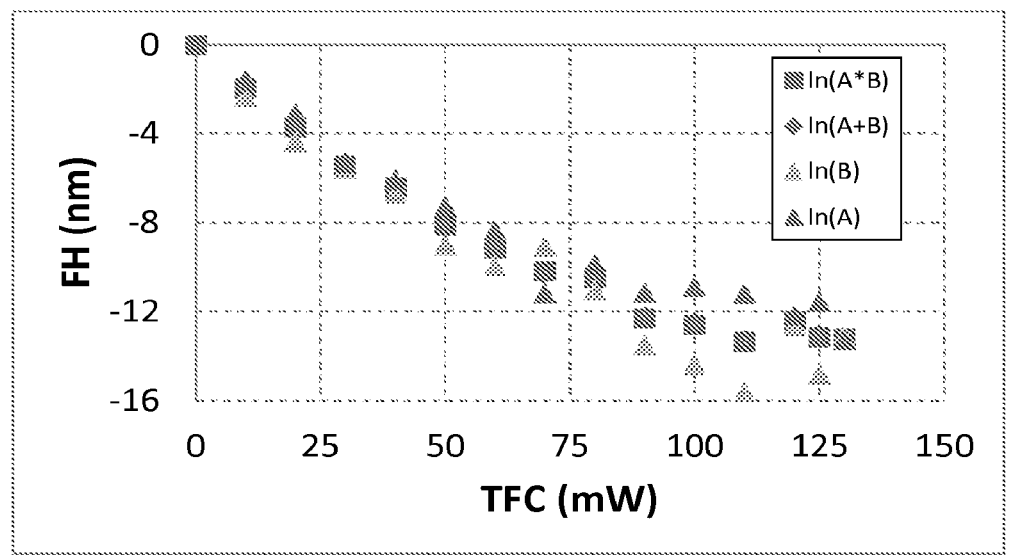
Figure 18:
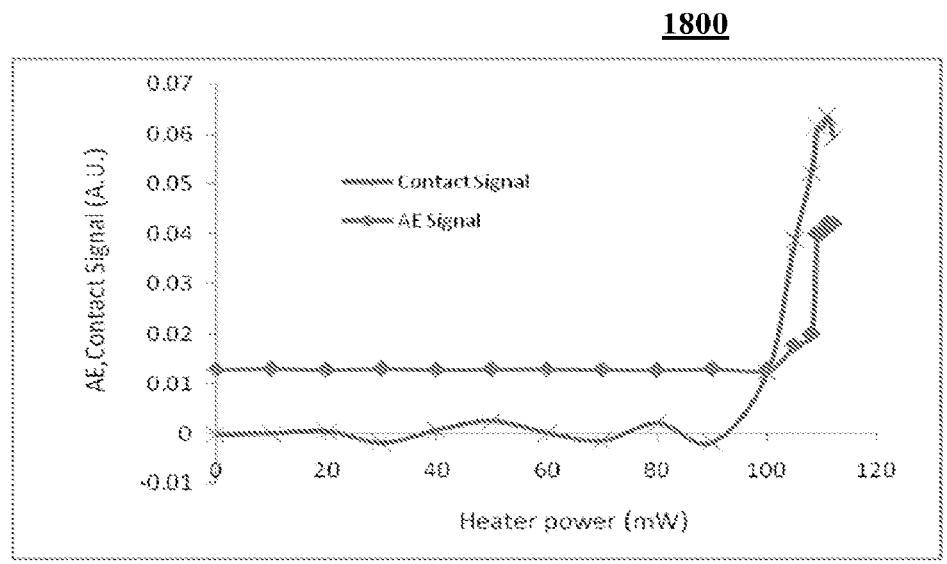
FIG. 18 illustrates a graph of a change in the flying height signal from thermal flying height control (TFC) actuation at different altitudes in accordance with the present embodiment.

FIG. 15, including FIGS. 15A and 15B, shows the touch down curve for respective methods of FH measurement. A graph 1500 in FIG. 15A shows the FH measurement after one hundred times averaging, while a graph 1550 in FIG. 15B indicates an arbitrary instantaneous one point FH measurement. The information depicted in the graph 1550 shows that the FH measured by a single frequency is greatly affected by off track error. This is further confirmed by the experimental results shown in a graph 1600 of FIG. 16. For these results, the TFC was fixed. It can be seen that the off-track FH variation error can be systematically studied by moving the reader sensor from −20 nm off-center to +20 nm off-center. However, ln(A−B) shows very little off-track FH variation error.

The instantaneous and always available FH signal can also be used as the contact detection sensor. FIG. 17A shows the time domain FH signal. In FIG. 17A, a graph 1700 shows FH signals 1705 and 1715 at different TFC powers. The FH signal 1715 shows a FH signal during normal operation while the vibration FH signal 1705 is clearly observed during the head disk contact at a higher TFC power. FIG. 17B depicts a graph 1720 which plots the root mean square (RMS) of the FH signal at different TFC powers where signals 1722, 1724, 1726 are obtained using ln(A+B), ln(B) and ln(A), respectively. In the graph 1720, the RMS measurements depict a clear sudden increase of value at contact TFC. In some cases, the FH's RMS can even detect the FH vibration prior the AE sensor as shown in a graph 1800 of FIG. This early detection can be attributed to pre-contact slider vibration. All of the above-mentioned FH measurement methods can be used as contact detection. Together with the continuous PES signal 1302, these give a two dimensional and fast response to near contact condition.

Figure 19:
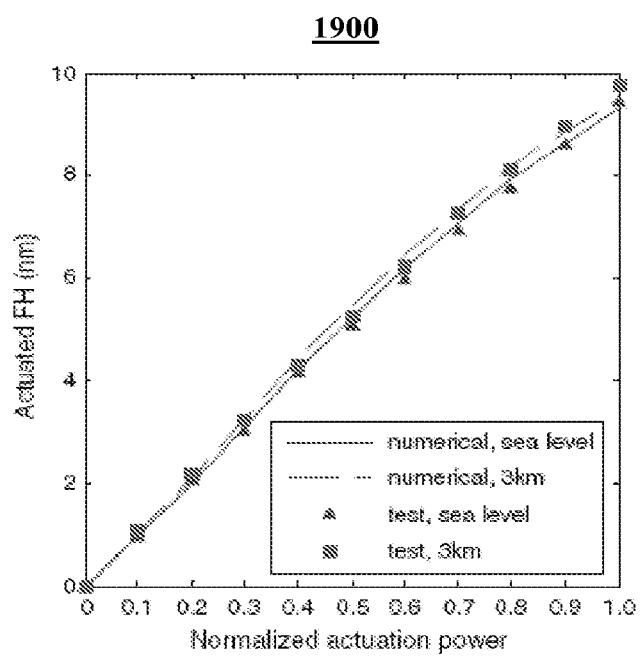
FIG. 19 illustrates a conventional graph of the curve of flying height versus TFC actuation as it varies at different altitudes.

As the FH versus TFC actuation curve is different at different altitudes (as shown in a prior art example in graph 1900 of FIG. 19), it is possible to create different FH calibration curves for different altitudes. One way is to calibrate and obtain curves under different air pressures corresponding to the different altitudes.

Subsequently, in actual HDD operation, by moving the operating point through changing the TFC actuation (without going to contact) and measuring the change in FH for each TFC power used, it is possible to determine the gradient, $\Delta FH/\Delta Power_{TFC}$. This parameter can be used to determine on which altitude curve the drive is operating. If the altitude curve is correctly determined, then appropriate FH look-up tables could be used and unnecessary and undesired head disk contact could be avoided by being able to apply the appropriate TFC power for different altitudes.

The ability to determine the altitude curve on which the drive is working is of great value. In present HDDs, it is difficult to incorporate an altitude sensor. Although drives have temperature sensors (e.g., thermistors), they generally do not have altitude sensors. This means that current HDDs do not know whether they are being operated at a high altitude (e.g., greater than twenty thousand feet) or at sea level. When at a high altitude, the flying height of the head is lower and there is increased chance of head-disk contact and reliability issues if an improper TFC power (such as that suitable for sea level use) is applied.

Appropriate look-up tables for HDD operation under different conditions of pressure (altitude) and temperature can be generated by operation in accordance with the present embodiment. Once these tables are generated, it is possible in accordance with the present embodiment to identify the right look up table to be used in actual drive operation, thus reducing the reliability problems associated with HDD usage at different altitudes. Without calibrated look-up tables for different altitudes, the common approach for current HDDs is to spin down the disk or adjust the TFC such that the head/slider comes into intermittent contact with the disk. Once this is done, the flying height is then known from the amount of TFC actuation applied. However, this touch down approach may wear out the RW heads and also has the risk of head disk damage. Therefore, reduction or elimination of the need to touch down the RW head is enabled by the present embodiment.

Another important advantage of the present embodiment is that the FH information is always available since the servo information is available everywhere for the dedicated servo HDD. Compared to current drives where FH measurement can only depend on a few designated and specially written areas on the disk (if readback signal approach to determine FH is used), the always available FH information for the dedicated servo disk comes at little cost, but brings about great benefits.

In accordance with one aspect of the present invention, a method for measuring flying height of a head over a disk medium in a hard disk drive (HDD) system having a disk medium including a buried servo layer having a first frequency of data on a first track and a second frequency of data on a second track, the second track adjacent to the first track, is provided. The method includes the steps of reading a readback signal by a head positioned at the middle of the first track and the second track, filtering the signal by a first filter centered at the first frequency to extract a first component signal, filtering the signal by a second filter centered at the second frequency to extract a second component signal, combining the first component signal and the second component signal using Wallace equations to generate a synchronization signal comprising flying height information. A second aspect includes developing a table of operational parameters for various pressures and temperatures from the flying height information for improved HDD system operation.

Thus it can be seen that methods for hard disk drive system operation have been disclosed which provides many advantages over the drawbacks of conventional HDDs. While several exemplary embodiments have been presented in the foregoing detailed description of the invention, it should be appreciated that a vast number of variations exist, including variations as to the materials, structure and operation of the data storage device.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements and method of play steps described in an exemplary embodiment without departing from the scope of the invention as set forth herein.

What is claimed is:

1. A system comprising:
    a write head configured to write a pattern on a track of a medium of a hard disk drive, wherein the pattern has a first frequency;
    a read head configured to read the pattern written on the track of the medium of the hard disk drive;
    a mixer configured to mix a first signal generated by reading the pattern with a second signal to obtain a mixed signal, wherein the second signal has a second frequency, and wherein the second frequency is different than the first frequency; and
    a filter configured to filter the mixed signal to determine a relative head-to-disk speed,
    wherein the filter has a parameter selected based on a difference between the first frequency and the second frequency.

2. The system of claim 1, wherein the write head of the hard disk drive is wider than the read head of the hard disk drive.

3. The system of claim 1, wherein the mixed signal includes signal components having frequencies at a sum of the first frequency and the second frequency and at a difference of the first frequency and the second frequency.

4. The system of claim 1, wherein the parameter of the filter includes a center frequency of the filter selected based on the difference between the first frequency and the second frequency.

5. The system of claim 1, wherein:
the parameter of the filter includes a center frequency of the filter that is offset by a predetermined frequency from the difference between the first frequency and the second frequency; and
the predetermined frequency is selected based on a range of variation of the relative head-to-disk speed to be measured.

6. The system of claim 1, wherein the parameter of the filter includes a width of a passband of the filter selected based on one or more of sensitivity and range of variation of the relative head-to-disk speed to be measured.

7. The system of claim 1, wherein the first frequency between 80 MHz and 150 MHz.

8. The system of claim 1, wherein:
the filter includes a first filter having a first center frequency selected based on the difference between the first frequency and the second frequency;
the filter includes a second filter having a second center frequency selected based on the difference between the first frequency and the second frequency, wherein the second center frequency is different than the first center frequency; and
the relative head-to-disk speed is determined based on outputs of the first filter and the second filter.

9. The system of claim 8, further comprising a combiner configured to determine the relative head-to-disk speed by normalizing the outputs of the first filter and the second filter.

10. The system of claim 8, wherein:
the first center frequency is selected by adding a frequency offset to the difference between the first frequency and the second frequency;
the second center frequency is selected by subtracting the frequency offset from the difference between the first frequency and the second frequency; and
the frequency offset is selected within a bandwidth of the first filter and the second filter.

11. A method comprising:
writing, using a write head of a hard disk drive, a pattern on a track of a medium of the hard disk drive, wherein the pattern has a first frequency;
reading, using a read head of the hard disk drive, the pattern written on the track of the medium of the hard disk drive;
mixing a first signal generated by reading the pattern with a second signal to obtain a mixed signal, wherein the second signal has a second frequency, and wherein the second frequency is different than the first frequency;
selecting a parameter of a filter based on a difference between the first frequency and the second frequency; and
filtering, using the filter, the mixed signal to determine a relative head-to-disk speed.

12. The method of claim 11, wherein the mixed signal includes signal components having frequencies at a sum of the first frequency and the second frequency and at a difference of the first frequency and the second frequency.

13. The method of claim 11, wherein the selecting the parameter of the filter includes selecting a center frequency of the filter based on the difference between the first frequency and the second frequency.

14. The method of claim 11, wherein the selecting the parameter of the filter includes selecting a center frequency of the filter that is offset by a predetermined frequency from the difference between the first frequency and the second frequency.

15. The method of claim 14, further comprising selecting the predetermined frequency based on a range of variation of the relative head-to-disk speed to be measured.

16. The method of claim 11, wherein the selecting the parameter of the filter includes selecting a width of a passband of the filter based on one or more of sensitivity and range of variation of the relative head-to-disk speed to be measured.

17. The method of claim 11, further comprising:
selecting the first frequency is between 80 MHz and 150 MHz; and
writing the pattern using the write head that is wider than the read head of the hard disk drive.

18. The method of claim 11, wherein the filtering the mixed signal using the filter includes:
filtering the mixed signal by a first filter having a first center frequency selected based on the difference between the first frequency and the second frequency;
filtering the mixed signal by a second filter having a second center frequency selected based on the difference between the first frequency and the second frequency, wherein the second center frequency is different than the first center frequency; and
determining the relative head-to-disk speed based on outputs of the first filter and the second filter.

19. The method of claim 18, further comprising determining the relative head-to-disk speed by normalizing the outputs of the first filter and the second filter.

20. The method of claim 18, further comprising:
selecting a frequency offset within a bandwidth of the first filter and the second filter;
selecting the first center frequency by adding the frequency offset to the difference between the first frequency and the second frequency; and
selecting the second center frequency by subtracting the frequency offset from the difference between the first frequency and the second frequency.

* * * * *